Dec. 6, 1955  A. KLEMENCIC  2,725,984
VIBRATORY CONVEYORS
Filed June 9, 1950

INVENTOR.
Adolf Klemencic
BY
ATTORNEY.

United States Patent Office 2,725,984
Patented Dec. 6, 1955

2,725,984
VIBRATORY CONVEYORS

Adolf Klemencic, Graz-Eggenberg, Austria, assignor to Ludwig Binder & Co., Graz-Eggenberg, Austria Application June 9, 1950, Serial No. 167,138

Claims priority, application Austria June 17, 1949

22 Claims. (Cl. 209—365)

The present invention relates in general to conveyors for fluent material such as gravel, chalk, cement, ashes, coal, sand, grain, etc., and it deals more particularly with vibratory or reciprocatory conveyors for such material.

An important object of the invention is to provide a conveyor of this type which has a vibration-free mounting, whereby the vibratory energy of the conveying system proper is not transmitted to the foundation on which it is supported.

Another object is to provide a vibratory conveyor mounted on a wheeled carriage or the like to permit moving same from place to place, the construction of the mounting being such that when the conveyor is in operation there is little or no tendency for it to shift the carriage.

A further object is to provide a vibratory conveyor capable of transporting fluent materials up grades of at least 25 per cent; and another object is to provide a convenient arrangement for varying the inclination of the conveyor trough.

Still another object is to provide conveyor troughs of novel form, better adapted for transporting materials of different size at relatively uniform rates of speed. The invention also contemplates the use of foraminous or perforated troughs for screening and sieving purposes.

A further object is to provide a novel power driving arrangement for vibratory conveyors or screening apparatus.

Other and further objects of the invention, together with the features of novelty whereby the objects are achieved, will appear in the course of the following description.

Figure 1:
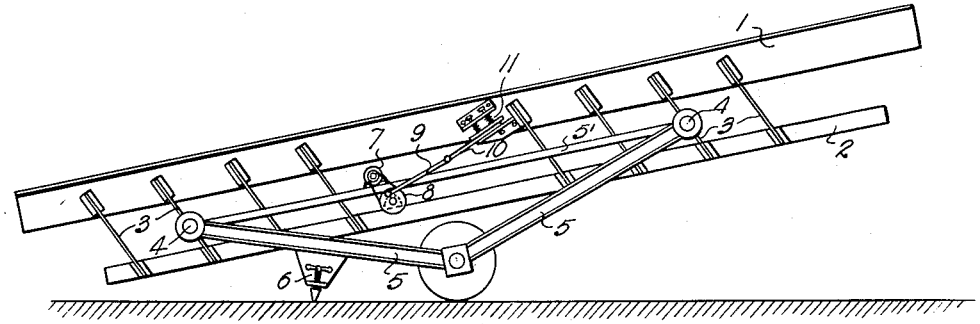

In the drawings which form a part of the specification and are to be read in conjunction therewith, and wherein like reference numerals are used to identify like or analogous parts in the various views, Fig. 1 is a side elevational view showing schematically a vibratory conveyor embodying the principles of my invention, said conveyor being arranged on a wheeled carriage.

Figure 2:
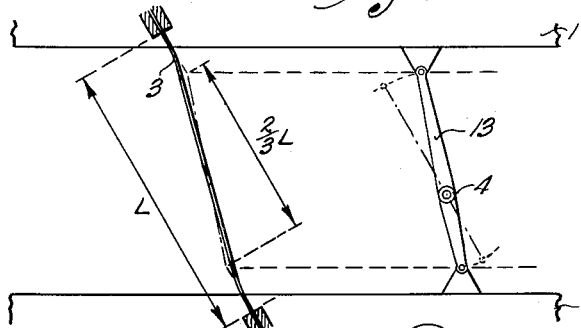
Figure 3:
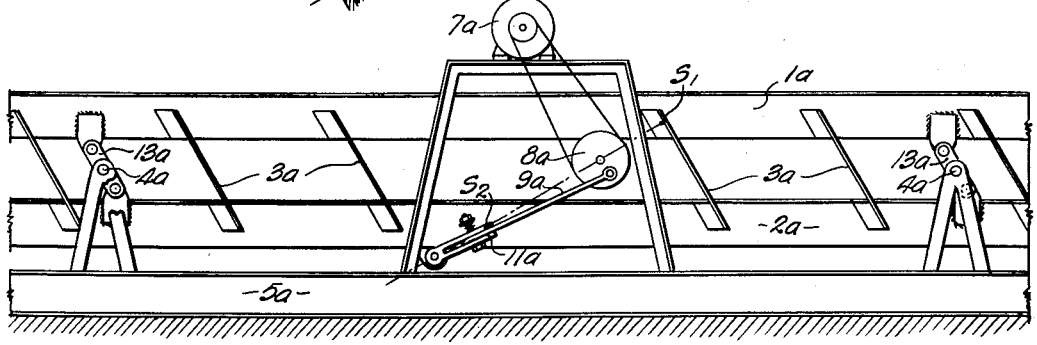

Fig. 2 is a schematic drawing illustrating the fundamental arrangement of parts when rigid pivotal links are employed in addition to the springs shown in Fig. 1, Fig. 3 is a side elevational view showing schematically another form of vibratory conveyor employing the same principles as that in Fig. 1 but involving a different arrangement of parts, Figs. 4 to 8 inclusive are transverse cross-sectional views of different forms of conveyor troughs that may be employed in my system.

Referring more particularly to the drawings, Fig. 1 shows a conveyor trough 1 connected to the balancing frame 2 (which if desired may be another conveyor trough) by means of a plurality of parallel leaf springs 3. At points 4, two of the springs on each side of the conveyor trough are pivotally connected to a carriage comprising struts 5 and a tie rod 5'; together members 5 and 5' form a rigid triangular frame which, in the case of this example, is mounted on wheels as shown. A tilting device 6 is provided on the carriage to adjust the inclination of the conveyor trough.

As will be explained more fully hereinafter, the pivots 4 are at the center of vibratory motion between elements 1 and 2. In order to vibrate these elements simultaneously in opposite directions, there is mounted on the carriage by means of the tie rods 5' a motor 7 which drives a crank or eccentric 8 by means of a belt. The crank shaft is carried by frame 2 and through a connecting rod 9, acts upon a push rod 10 which in turn is connected to the trough 1 through an adjustable friction device 11. Essentially this device comprises a fixed bearing plate secured on trough 1, against which plate the push rod is urged by a spring or springs whose tension may be adjusted to vary the clamping effect upon the push rod.

The purpose of the friction device will be understood if it is appreciated that on starting the motor the conveyor 1 and the balancing frame 2 have considerable inertia due to their mass and the springs 3 also have considerable tension which must be overcome. Obviously, therefore, when the conveyor system is at rest it would impose a tremendous overload upon the motor to immediately swing the conveyor and frame 2 through full stroke.

My friction device overcomes this difficulty and permits the use of a motor of much less power than otherwise would be necessary inasmuch as it allows the reciprocatory push rod to slide axially relative the fixed bearing on the conveyor 1 when, during the starting period, the inertia of the moving parts is greater than the frictional force maintained between the push rod and said bearing plate by the springs. That is to say, the stroke of the push rod always is uniform, but since the connection between the push rod and trough is not fixed, the vibratory movement or displacement of the trough is less than the stroke of the push rod at the outset; gradually the vibratory movement increases as the swinging trough and frame 2 gain momentum until their displacement conforms with the stroke of the push rod after which the friction device serves as a relatively rigid drive connection.

The driving force transmitted through this connection can be varied by changing the tension of the springs which press the push rod and fixed bearing on the trough together. It is preferable that the friction surfaces be pressed together only to such an extent that the inertia due to normal vibratory frequency and maximum load can safely be overcome.

Another advantage of the foregoing arrangement is that the relative position of the driving crank and the trough need not be maintained exactly as the friction connection will compensate for any errors or positional changes of the load. It also acts as a safety device to protect the driving mechanism from any shock to which it might be subjected but for the relative motion permitted by the friction connection.

It is important to note that the pivots 4 are in the center of the swinging movement of members 1 and 2, i. e., at those points along the length of springs 3 which remain stationary as the upper and lower ends of the springs flex in unison in opposite directions. Since all of the springs flex alike it will be seen that all of them which cross tie rod 5' are stationary at the point of intersection with that tie rod; hence, additional pivotal bearings like 4 may be employed along rod 5' at the point where same intersects the various springs if such is desirable for purposes of giving increased support to the swinging system. Pivots 4 preferably are mounted in rubber bushings of conventional construction to further minimize the transmission of vibration to the supporting carriage.

If the masses of trough 1 and frame 2 are equal, points 4 (the center of the swinging motion) will be mid-way between the ends of the spring 3. However, if the masses are unequal, as is true in the example shown in Fig. 1, pivots 4 will not be at the center of the springs, but rather are so offset that the distances from the pivot to the opposite ends of the spring in each case are inversely proportional to the respective masses.

Instead of using the springs 3 themselves to support trough 1 and frame 2 on carriage 5, 5', use may be made of rigid arms 13 (see Fig. 2) located between and parallel to the springs. Pivotally connected at its upper and lower ends to the trough and frame respectively, each arm would, according to this modification, be pivoted at 4 (the center of its swinging motion) to the carriage 5, 5', leaving all of the springs 3 free of any direct connection to the carriage.

Such an arrangement is illustrated in Fig. 3. Here the vibratory members comprise an upper conveyor trough 1a and a lower conveyor trough 2a connected by leaf springs 3a and also by the rigid pivotal links 13a. For convenience, the support for these elements has been shown as a stationary horizontal base 5a having uprights to which the links are pivoted at 4a and also having a superstructure which carries the motor 7a. Because the two troughs are of equal mass, the pivots 4a are located in the center of links 13a rather than being offset as in Fig. 2.

Through a belt, motor 7a drives a crank or eccentric 8a mounted on the upper conveyor trough and this in turns acts upon a connecting rod 9a which is connected to the lower conveyor trough by the friction device 11a. The latter functions in the same way as explained in connection with the friction device of Fig. 1, that is to say, it permits relative movement or lost motion during starting of the system, but when the system is in full operation, it serves as a fixed connection between the connecting rod and the lower trough.

Because both in the Fig. 1 construction and in the Fig. 3 construction, elements 1 and 2 (or elements 1a and 2a) form a combined and balanced swinging system, and because this system is supported in each case by a carriage or base connected thereto at the center of the swinging motion, which center is free of movement, it will be seen that the support is not subjected to vibratory forces. In the case of the Fig. 1 arrangement, this, of course, eliminates any tendency the carriage might otherwise have to creep and shift while the mechanism is in operation; in the case of the Fig. 2 arrangement, it eliminates or greatly minimizes the transmission of vibration to the foundation on which the base 5a rests and makes it unnecessary to provide an elaborate anchorage for the base. Although base 5a is shown horizontal in Fig. 3, it will be clear that it can be on an incline, and, as a matter of fact, can be provided with rollers or other suitable means for moving it from place to place if desired.

The motor in each form of conveyor illustrated, is mounted on the stationary carriage or base, and therefore is protected from the vibratory motion of the swinging system. In each case it drives a crank or eccentric carried by one of the swinging members, and in order to minimize the effect of relative movement between the center of the motor shaft and the center of the crank shaft, it will be noted that the two shafts are mounted in such a way that a line drawn through their centers is parallel to the leaf springs in their rest position, and thus vertical to the direction of vibration.

In order to minimize the effect of accelerative forces on the driving mechanism, the whole swinging system is constructed to resonate at a natural frequency coinciding with the frequency of the driving mechanism, that is, with the speed at which the crank is driven by the motor. This is achieved by selecting a suitable number of springs of suitable strength, etc., the springs preferably being placed at intervals along the whole length of the conveyor trough as indicated.

With a view to avoiding components of the driving force which would fall outside the direction of vibration (and therefore to avoid unwanted vibrations in the support), my driving mechanism is constructed to exert its thrust between the upper and lower troughs (or between the trough 1 and its balancing frame 2) substantially along a line connecting the centers of gravity of the upper and lower swinging members, this connecting line being at right angles to the leaf springs. Thus, referring to Fig. 3 where $S_1$ is the center of gravity of the upper trough and $S_2$ is the center of gravity of the lower trough, it will be seen that the line connecting the two centers of gravity is the same line that connects the center of the crank shaft with the center of the pivot pin at the lower end of the connecting rod; also this line is perpendicular to the leaf springs 3a.

By this arrangement the upper and lower troughs (or the trough 1 and its balancing frame 2) are placed in such relative motion that their centers of gravity move toward and away from one another along the line connecting said centers, the driving thrust between them being also applied along this line. This is done to avoid disturbing moments and forces. So far as I am aware, this principle has never before been applied to vibratory conveyors with their relatively long stretched out masses, and it is possible only by suspending the two members as contemplated by my invention.

When, as shown in Figs. 2 and 3, the upper and lower members of the swinging system are carried on the support or base by pivoted links 13 or 13a rather than by means of the leaf springs themselves, as shown in Fig. 1, the length of the link from its upper to its lower pivot must be two-thirds the free length of the leaf springs. As indicated in Fig. 2, a leaf spring which is held fixedly at both ends has the same kinematic motion as a rigid link of two-thirds the free length of the spring.

Figure 4:
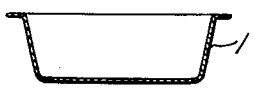
Figure 5:
Figure 6:
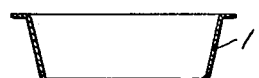
Figure 7:
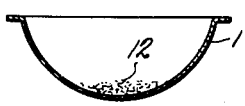
Figure 8:

Fig. 4 shows the usual cross section of the conveyor trough employed in my system. However, if only a small amount of material is placed in the trough, it will spread out thinly and, as small pieces are moved more quickly than bigger pieces, there is an undesirable amount of sorting out; to eliminate this, the cross section of the trough can be built with a V-shaped bottom (see Figs. 5 and 6) or a round bottom (Fig. 7) and the material 12 then will stay close together even in small quantities, with elimination of sorting. Fig. 8 shows a cross section of a conveyor for powder-like material, this being provided with a cover to prevent loss of the material into the air.

As has been indicated previously, my invention also contemplates that the bottom of the trough can be perforated and built as a sieve in which case particles of a size larger than the perforations will be carried along the trough as is true in unperforated conveyors, while the smaller particles will drop out through the perforations. In units of this kind the construction shown in Fig. 3 (having upper and lower troughs) is favored, inasmuch as particles dropping through perforations in the upper trough can be conveyed away by the lower trough, or if desired, the lower trough can also be provided with perforations to perform a second sieving operation.

From the foregoing it will be seen that this invention is one well adapted to attain all of the ends and objects hereinbefore set forth, together with other advantages which are obvious and which are inherent to the apparatus.

It will be understood that certain features and subcombinations are of utility and may be employed without reference to other features and subcombinations. This is contemplated by and is within the scope of the appended claims.

Inasmuch as many possible embodiments of the invention may be made without departing from the scope thereof, it is to be understood that all matter herein set forth or shown in the accompanying drawings is to be interpreted as illustrative and not in a limiting sense.

Having thus described my invention, I claim:

1. In a vibratory conveyor comprising, a conveyor trough and an elongate frame member, and a pair of links pivotally connected at their ends to said trough and frame member to form an articulated parallelogram; spring tuning means directly connecting said trough and frame members; a base for supporting said articulated parallelogram; means pivotally connecting said links at points intermediate their ends to said base whereby said trough and frame member form a tuned two-mass swing system; and the mass of said trough and the mass of said frame member being in balance relative to said intermediate points and drive means for imparting impulses simultaneously to said trough and frame member causing them to move in opposite directions and reciprocate relative to each other and relative to said base as a balanced tuned mechanism.

2. In a vibratory conveyor comprising a conveyor trough and an elongate frame member, a pair of links pivotally connected at their ends to said trough and frame member to form an articulated parallelogram; a base for supporting said articulated parallelogram; means pivotally connecting said links at points intermediate their ends to said base whereby said trough and frame member form a two-mass swing system; and a plurality of leaf springs paralleling said links with their opposite ends rigidly connected respectively to said trough and frame member; to define the position of the trough and frame and to tune the mechanical two-mass swing system with the driving energy impulses.

3. In a vibratory conveyor comprising a conveyor trough and an elongate frame member, a pair of links pivotally connected at their ends to said trough and frame member to form an articulated parallelogram; a base for supporting said articulated parallelograms; means pivotally connecting said links at points intermediate their ends to said base whereby said trough and frame member form a two-mass swing system; spring tuning means directly connecting said trough and frame members; a crank rotatably mounted on said trough to turn about an axis transverse to the longitudinal axis of the trough; a connecting rod pivoted at one end to said crank and pivoted at its opposite end to said frame member; and a prime mover connected to said crank for rotating same.

4. A vibratory conveyor as in claim 3, wherein said prime mover is fixedly mounted on said base.

5. A balanced reciprocating mechanism comprising spaced frames, guide arms pivotally connecting said frames so they can swing relative to each other and form a plural mass swing system, a spring tuning means directly connecting said frames, a support for said frames pivotally connected to a center of vibration intermediate the ends of the guide arms, and drive means connecting both frames and intermittently operated to push them apart to oscillate said frames and cause them to reciprocate relative to each other and relative to said support.

6. The structure of claim 5 which also includes a material handling device means comprising a conveyor trough means on one frame and a weight means on the other.

7. The structure of claim 5 characterized in that each of said frames comprises a conveyor trough means, both conveyor trough means to convey material in the same direction.

8. The structure of claim 5 which also includes a material handling device means comprising a conveyor screen trough means on the upper frame and a solid conveyor trough means on the lower frame.

9. The structure of claim 5 characterized in that said support includes a carriage and bearings on said carriage to carry said vibratory mechanism at the center of its vibratory motion intermediate the ends of the guide arms.

10. The structure of claim 5 characterized in that said drive means includes a rotary crank on one frame and a pivotal connection on the other frame, a push rod means connected to said crank at one end and to said pivotal connection at the other end.

11. The structure of claim 10 characterized in that said pivotal coupling includes a friction coupling having friction surfaces urged together by adjustable pressure means.

12. A vibratory mechanism as in claim 5 characterized in that said drive means includes a rotary crank mounted on one frame, a push rod connecting said crank and said other frame, a rotary driving motor mounted on said support to operate said crank, the rotary axis of said crank and the rotary axis of said motor being disposed in a plane substantially at right angles to reciprocatory motion of the frames.

13. A vibratory mechanism comprising a pair of frames and at least two guide means connected at their ends to said frames to form an articulated parallelogram, a support, means pivotally connecting said guide means at points intermediate their ends to said support whereby said frames form a suspended dual mass swing system, spring tuning means directly connecting said frames, and power-operated mechanism connecting both frames and intermittently operated for periodically applying a thrust to reciprocate said frames in opposite directions.

14. The structure of claim 13 characterized in that said guide means are links pivotally connected at their ends to said frames, the length between said pivoted ends of said links being two-thirds the length of said flexible springs.

15. The structure of claim 13 characterized in that said means pivotally connecting said guide means at points intermediate their ends to said support which includes rubber bushings.

16. The structure of claim 13 characterized in that the centers of gravity of said frames respectively are disposed along a plane substantially at right angles to said guide means.

17. The structure of claim 16 characterized in that said power-operated mechanism includes a push rod for periodically applying a thrust along the plane connecting the centers of gravity of said frames.

18. A vibration-free mounting reciprocating mechanism comprising a plurality of spaced frames, a plurality of interconnecting means including tuned spring members each having its opposite ends attached to said spaced frames to provide a tuned multimass vibratory system, support means attached intermediate selected of said interconnecting means, a rotary crank means mounted on one frame to provide energy pulsations, and push rod means operated by said rotary crank means and attached to said other frame to oscillate said frames in opposite directions and at a period in synchronism with the energy pulsations of the rotary crank means and close to the natural period of the interconnecting means.

19. A vibration-free mounting reciprocating mechanism comprising a plurality of spaced frames, a plurality of interconnecting means including tuned spring members each having its opposite ends attached to said spaced frames to provide a tuned multimass vibratory system, support means attached intermediate selected of said interconnecting means, motor means connected with a crank on one frame, and push rod means between said crank and the other frame to reciprocate said frames in opposite directions.

20. In a vibratory conveyor comprising an upper conveyor trough and a lower conveyor trough, a pair of links pivotally connected at their ends to said upper trough and said lower trough to form an articulated parallelogram, spring tuning means directly connecting the upper trough with the lower trough, a base for supporting said articulated parallelogram, means pivotally connecting said links at points intermediate their ends to said base whereby the upper and lower troughs form a tuned two mass swing system, the masses of said upper trough and said lower trough being in balance relative to said intermediate points, and drive means for imparting impulses simultaneously to said upper and lower conveyor troughs causing them to move in opposite directions and reciprocate relative to each other and relative to said base as a balanced tuned mechanism.

21. The structure of claim 20 which includes a driving motor mounted on a base and having a flexible drive means mounted to be effective in imparting impulses simultaneously in opposite directions to said upper and lower troughs of said tuned two mass swing system.

22. A vibratory balanced reciprocating mechanism comprising spaced elements, a pair of links pivotally connected at their ends to said elements to form an articulated parallelogram, spring tuning means directly connecting each of said spaced elements, a base for supporting said articulated parallelogram, means pivotally connecting said links at a point intermediate their ends to said base whereby said elements form a tuned and balanced two mass swing system, the masses of each element being in balance relative to said intermediate points, and drive means for imparting impulses simultaneously to each of said elements causing them to move in opposite directions and reciprocate relative to each other and relative to said base as a balanced tuned mechanism.

References Cited in the file of this patent

UNITED STATES PATENTS

| | | |
|---|---|---|
| 627,706 | Phillips | June 27, 1899 |
| 1,082,352 | Morrow | Dec. 23, 1913 |
| 1,293,556 | Sandels | Feb. 4, 1919 |
| 1,495,850 | Jacquelin | May 27, 1924 |
| 1,757,392 | Schieferstein | May 6, 1930 |
| 1,979,791 | Blackburn | Nov. 6, 1934 |
| 2,279,742 | Overstrom | Apr. 14, 1942 |
| 2,297,486 | Tinke | Sept. 29, 1942 |
| 2,358,876 | Overstrom | Sept. 26, 1944 |
| 2,458,077 | Jacobsen | Jan. 4, 1949 |

FOREIGN PATENTS

| | | |
|---|---|---|
| 838,609 | France | Dec. 7, 1938 |